United States Patent Office 3,262,968
Patented July 26, 1966

3,262,968
PROCESS FOR THE PREPARATION OF α-FLUOROACRYLATES
John Andrew Sedlak and Ken Matsuda, Stamford, Conn., assignors to American Cyanamid Company, Stamford, Conn., a corporation of Maine
No Drawing. Filed Nov. 7, 1963, Ser. No. 322,027
3 Claims. (Cl. 260—486)

This invention relates to the preparation of α-fluoroacrylates. More particularly, it relates to the preparation of esters of α-fluoroacrylic acid in good yield and purity directly obtained from fluoroacetates.

In the past, it has been difficult, if not impractical, to obtain esters of α-fluoroacrylic acid from fluoroacetates in good yield and purity. A more successful method for preparing α-fluoroacrylates is disclosed and claimed in United States Letters Patent No. 3,075,002 to J. A. Sedlak, issued on January 22, 1963. This patent discloses a process for preparing α-fluoroacrylates by reacting a fluoroacetate in the presence of a strong base, such as an alkali metal alkoxide, followed by reaction with an aldehyde, such as formaldehyde or paraformaldehyde. Unfortunately, the yield obtained, although good in view of the direct nature of the process, is not completely satisfactory for commercial exploitation. If a process could be found in which α-fluoroacrylates are obtained in good yield and purity that is acceptable commercially, such a process would be highly desirable.

It is, therefore, a principal object of the present invention to prepare unsubstituted α-fluoroacrylates in good yield and purity. Other objects and advantages will be readily ascertained from a consideration of the following detailed description.

It has been unexpectedly found that esters of α-fluoroacrylic acid of the structure:

$$CH_2=CFCOOR$$

wherein R is a lower alkyl radical, such as methyl, ethyl, propyl, butyl, pentyl, hexyl or heptyl, can be obtained in a straightforward manner in good yield and purity. The reaction is readily accomplished by admixing a dialkyl oxalate with an alkyl fluoroacetate in the presence of a strong base, and reacting the so-formed mixture with an aldehyde. In so-proceeding, the overall yield of unsubstituted α-fluoroacrylates is increased from approximately 15% when the dialkyl oxalate is omitted to about 60%, or higher, in the presence of the dialkyl oxalate.

The stepwise reaction may be written as follows:

(I)
$$ROCOCOOR + CH_2FCOOR \xrightarrow[MeH]{MeOR \text{ or}} [ROCOCOCHFCOOR]$$

dialkyloxalate + alkyl-  ⟶ oxalyl fluoroacetate ester
fluoroacetate (II) $[ROCOCOCHFCOOR] + (CH_2O)_x$
$\rightarrow CH_2=CFCOOR$ wherein Me is an alkali metal, such as sodium or potassium, R is lower alkyl, and x is unity, or higher. Although equimolar proportions are indicated in the overall reaction, a mol excess of the reactants can be employed without adversely affecting the yield.

The alkyl fluoroacetates contemplated are the methyl, ethyl, propyl, butyl, pentyl, hexyl or heptyl fluoroacetates. Isomers of the alkyl substituents are also within the purview herein. Further, the dialkyl oxalates contemplated herein are: dimethyl oxalate, methyl ethyl oxalate, diethyl oxalate, dipropyl oxalate, dibutyl oxalate, and mixtures thereof.

The formaldehyde reactant can be utilized in any convenient form. Thus, monomeric formaldehyde, conveniently obtained from one of its polymers, paraformaldehyde, by heating the latter and collecting resultant formaldehyde vapor, can be directly introduced into the reaction product resulting from the addition of the oxalate to the fluoroacetate in the presence of a strong base. Alternatively, polymeric formaldehyde can be directly employed during reaction without initially generating formaldehyde vapor.

Illustrative of strong bases that can be employed in the process of the invention are, for example: alkali metal hydrides, such as sodium hydride, potassium hydride, and alkali metal alkoxides, such as sodium methoxide, potassium methoxide, sodium ethoxide and sodium propoxide. It is convenient to incorporate in the reaction medium a solvent, such as tetrahydrofuran, ether, benzene, petroleum ether, tetramethylene sulfone, dimethyl sulfoxide, and the glycol ethers, such as the dimethyl ether of ethylene glycol.

A reaction time from about one hour to forty-eight hours is found to be sufficient to effect completion of the overall reaction. At the end of this time, the reaction mass is treated as by distillation, evaporation or extraction in the absence of water. Unexpectedly, an aqueous environment is not required to recover the desired α-fluoroacrylates.

The temperature employed in the process of the invention can be widely varied. Usually, a temperature range between about 0° C. and about 75° C. is satisfactory for optimum operation.

To facilitate a further understanding of the invention, the following examples are presented, primarily for purposes of illustrating certain more specific details thereof. Except as defined in the claims, the scope of the disclosure herein is not to be taken as limitative of the invention. Unless otherwise noted, parts given are by weight.

Example 1

In an anhydrous atmosphere, 61.4 parts of dimethyl oxalate are dissolved in 170 parts of dry tetrahydrofuran at room temperature. With cooling, 30.8 parts of sodium methoxide are added with vigorous stirring, causing a temporary exotherm. To the stirred mixture maintained at about 45° C., a solution of 48 parts of methyl fluoroacetate in 45 parts of tetrahydrofuran is added dropwise during five hours. After an additional hour, the mixture is stirred at reflux for one hour. The mixture is then cooled to room temperature and is allowed to stand for sixteen hours.

To the stirred mixture at room temperature, 16.4 parts of paraformaldehyde are added. An immediate exotherm raises the temperature to 58° C. The mixture is refluxed for ten minutes and is then rapidly cooled to room temperature. 650 parts of methylene chloride are added. With vigorous agitation, the mixture is stripped of the volatiles by gradually lowering the pressure to one millimeter Hg and gradually raising the temperature to 50° C.

The condensate from the stripping operation is distilled at atmospheric pressure and then at reduced pressure to remove the methylene chloride and most of the tetrahydrofuran. The product is distilled at 150 mm. Hg to yield 54.8 parts of distillate having a boiling point of from 30° C. to 58.9° C. at 150 mm. Hg and consisting of 7.6 parts of tetrahydrofuran, 41.1 parts of methyl α-fluoroacrylate, and 6.1 parts of methyl fluoroacetate. The conversion of methyl fluoroacetate is 41.4 parts, or 87%, and the yield of methyl α-fluoroacrylate, based on this conversion, is 89%.

Example 2

In an anhydrous atmosphere, 61.4 parts of dimethyl oxalate are dissolved in 170 parts of dry tetrahydrofuran at room temperature. The solution is then cooled to 0° C. 30.8 parts of sodium methoxide are added with vigorous stirring, causing a temporary exotherm.

To the stirred mixture, a solution of 48 parts of methyl fluoroacetate in 45 parts of tetrahydrofuran is added dropwise during six hours. Temperature during the addition does not exceed 3° C. The mixture is stirred at 0° C. for one and one-half hours and then at room temperature for sixteen hours.

The mixture is cooled to 0° C. and to the latter are added 15.6 parts of paraformaldehyde. A strong exotherm develops after about five minutes, accompanied by a thickening of the mixture. After ten minutes, the temperature rises to about 35° C. The mixture is then allowed to stand in the ice bath for one hour.

To the cold reaction mixture are added 650 parts of methylene chloride cooled to 0° C. With vigorous agitation, the mixture is stripped of the volatiles by gradually lowering the pressure to one millimeter Hg and gradually raising the temperature to 25° C.

The condensate from the stripping is distilled at atmospheric pressure and then at reduced pressure to remove the methylene chloride and most of the tetrahydrofuran. The product is distilled at 150 mm. Hg to yield 38.5 parts of distillate having a boiling point of 28.2° C. to 51.8° C. at 150 mm. Hg consisting of 4.3 parts of tetrahydrofuran, 32.3 parts of methyl α-fluoroacrylate, and 1.9 parts of methyl fluoroacetate. The conversion of methyl fluoroacetate is 45.6 parts, or 96%, and the yield of methyl α-fluoroacrylate, based on this conversion, is 62%.

The residue from the stripping is stirred with 120 parts of anhydrous methanol at 0° C. Concentrated sulfuric acid, 29.2 parts, is added dropwise at 0° C. during one hour. The mixture is then stirred briefly at reflux, and is filtered with 40 parts of methanol washings. The filtrate is distilled to remove 99 parts of methanol and the remaining liquid is treated with 35 parts of concentrated sulfuric acid added dropwise during forty-five minutes. After heating to reflux and adding 16 parts of methanol, the solution is cooled to 2° C. to crystallize 42.7 parts of dimethyl oxalate, and then to minus (−) 20° C. to collect a second crop of 3.8 parts. Total recovery of dimethyl oxalate is 46.5 parts, or 72%.

*Example 3*

Repeating the procedure of Example 2 in every detail, except that 425 parts of xylene are employed instead of 650 parts of methylene chloride, the conversion of methyl fluoroacetate is 45.2 parts, or 95%, and the yield of methyl α-fluoroacrylate based on this conversion is 36.3 parts, or 71%.

*Example 4*

Repeating the procedure of Example 2 in every detail, except that 92.0 parts of dimethyl oxalate, 42.1 parts of sodium methoxide and 31.2 parts of paraformaldehyde are employed, the conversion of methyl fluoroacetate is 100% and the yield of methyl α-fluoroacrylate based on this conversion, is 34.5 parts or 64%.

We claim:

1. In an improved process for preparing unsubstituted α-fluoroacrylic acid esters having the structure:

$$CH_2=CFCOOR$$

wherein R is a lower alkyl radical, prepared from the reaction between equimolar amounts of an ester of fluoroacetic acid having the structure:

$$CH_2FCOOR$$

wherein R is defined as above, and an aldehyde selected from the group consisting of monomeric formaldehyde and paraformaldehyde, in the presence of a strong base, selected from the group consisting of alkali metal hydrides and alkali metal alkoxides, the improvement which comprises: admixing at least an equimolar amount of a di(lower)alkyl oxalate with the said fluoroacetic acid ester, reacting the latter mixture with said aldehyde, maintaining the reaction mass at a temperature of between about 0° C. and 75° C., and thereafter recovering anhydrously desired α-fluoroacrylate in good yield and purity.

2. A process according to claim 1, in which the lower alkyl oxalate is dimethyl oxalate, the α-fluoroacetate is methyl fluoroacetate, and the base is sodium methoxide.

3. A process according to claim 1, in which the lower alkyl oxalate is diethyl oxalate, the α-fluoroacetate is ethyl fluoroacetate, and the base is sodium ethoxide.

References Cited by the Examiner

UNITED STATES PATENTS

| 3,014,958 | 12/1961 | Koch | 260—486 |
| 3,075,002 | 1/1963 | Sedlak | 260—486 |

LORRAINE A. WEINBERGER, *Primary Examiner.*

LEON ZITVER, *Examiner.*

D. P. CLARKE, A. P. HALLUIN, *Assistant Examiners.*